(12) United States Patent
Faber et al.

(10) Patent No.: US 9,312,668 B2
(45) Date of Patent: Apr. 12, 2016

(54) ARC RESISTANT SHUTTERS

(71) Applicant: SCHNEIDER ELECTRIC USA, INC., Palatine, IL (US)

(72) Inventors: Tim Faber, Marion, IA (US); Cameron Woodson, Cedar Rapids, IA (US); German Romero Legorreta, Guadalupe (MX)

(73) Assignee: SCHNEIDER ELECTRIC USA, INC., Schaumburg, IL (US)

( * ) Notice: Subject to any disclaimer, the term of this patent is extended or adjusted under 35 U.S.C. 154(b) by 94 days.

(21) Appl. No.: 14/310,660

(22) Filed: Jun. 20, 2014

(65) Prior Publication Data
US 2015/0372460 A1 Dec. 24, 2015

(51) Int. Cl.
*H02B 1/14* (2006.01)
*H01H 9/22* (2006.01)
*H02B 11/24* (2006.01)
*H01B 17/42* (2006.01)
*H02B 1/21* (2006.01)
*H02B 1/30* (2006.01)
*H02B 11/04* (2006.01)

(52) U.S. Cl.
CPC .................. *H02B 1/14* (2013.01); *H01B 17/42* (2013.01); *H01H 9/22* (2013.01); *H02B 1/21* (2013.01); *H02B 1/30* (2013.01); *H02B 11/24* (2013.01); *H02B 11/04* (2013.01)

(58) Field of Classification Search
None
See application file for complete search history.

(56) References Cited

U.S. PATENT DOCUMENTS

| | | | | |
|---|---|---|---|---|
| 3,610,850 A | * | 10/1971 | Eichelberger | H02B 11/24 200/50.21 |
| 4,565,908 A | * | 1/1986 | Bould | H02B 11/24 200/50.22 |
| 5,343,355 A | * | 8/1994 | Ishikawa | H02B 11/24 200/304 |
| 6,414,839 B1 | * | 7/2002 | Derksen | H02B 11/24 200/50.22 |
| 6,448,519 B1 | * | 9/2002 | Rane | H02B 11/04 200/293 |
| 7,646,271 B2 | * | 1/2010 | Gottschalk | H01H 9/0264 200/50.32 |
| 8,809,705 B2 | * | 8/2014 | Serrano | 200/50.21 |
| 2007/0137991 A1 | * | 6/2007 | Kashyap | H02B 11/24 200/50.22 |
| 2012/0314340 A1 | | 12/2012 | Faber et al. | |
| 2013/0279083 A1 | * | 10/2013 | Faber | H02B 13/025 361/618 |
| 2015/0064949 A1 | * | 3/2015 | Rahn | H02B 1/04 439/212 |

FOREIGN PATENT DOCUMENTS

DE 102011000837 8/2012
JP 5163132 5/1976

OTHER PUBLICATIONS

Extended European Search Report for EP Application No. EP 15172360.8-1801 dated Oct. 26, 2015.

* cited by examiner

*Primary Examiner* — Courtney Smith
(74) *Attorney, Agent, or Firm* — Locke Lord LLP

(57) ABSTRACT

A connection system for connecting electrical devices to busses within a switchgear cabinet includes an independently movable shutter that slides along a bus bar, the shutter covering access to the bus bar in a disconnected position and allowing access in a connected position. The bus bar has an insulator cap covering its free end. The shutter is mounted to a spring-biased support. The shutter has an opening through which the bus bar passes. The shutter slides along the bus bar backwardly away from the insulator cap, in the connected position. The shutter slides forwardly along the bus bar toward the insulator cap, in the disconnected position. The insulator cap fits closely within the opening in the shutter to prevent access to the bus bar when in the disconnected position. The shutter can fit within arc attenuating phase barriers surrounding each bus bar and be constructed to be arc resistant.

20 Claims, 18 Drawing Sheets

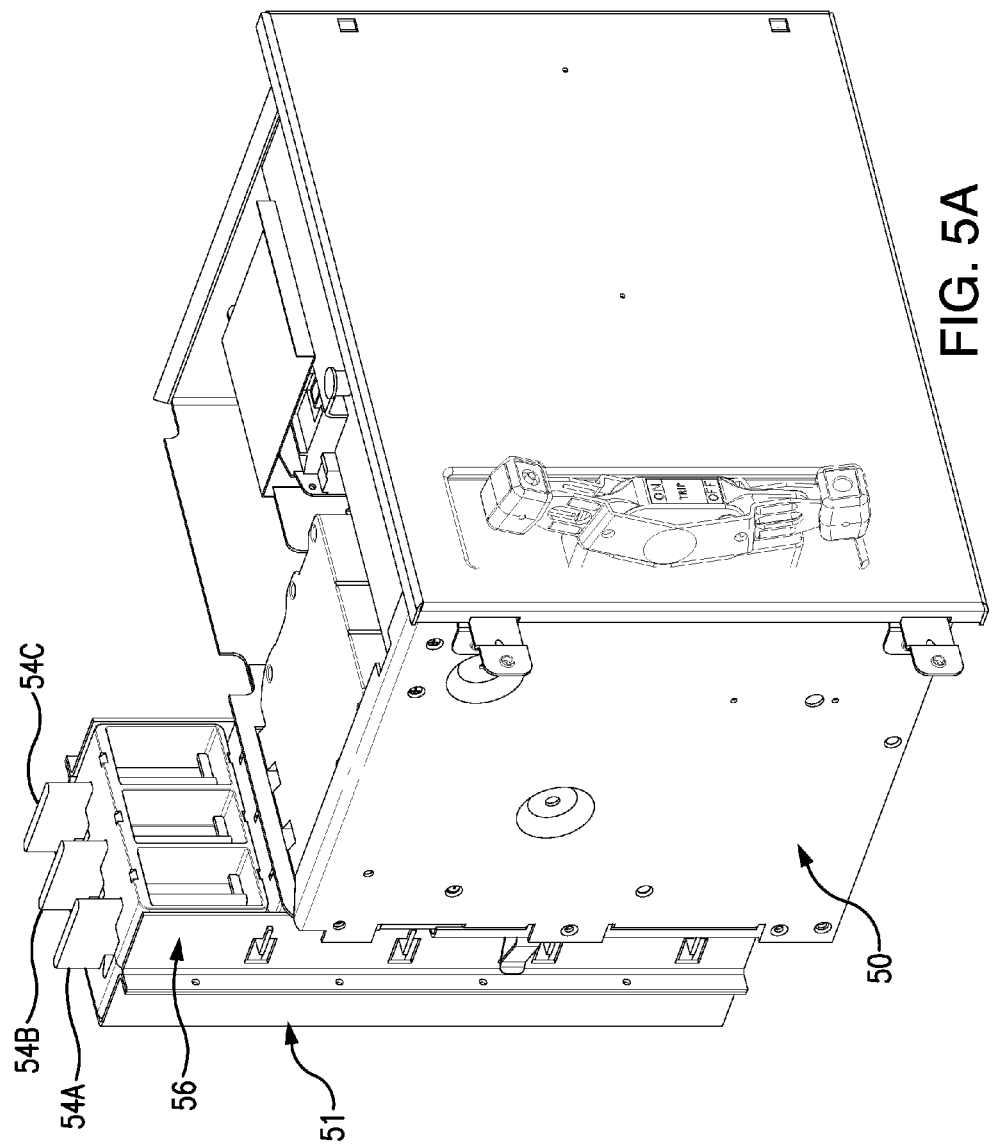

ARC RESISTANT SHUTTERS

BACKGROUND OF THE INVENTION

1. Field of the Invention

The invention disclosed relates to arc resistant electrical distribution equipment.

2. Discussion of the Related Art

Circuit breakers used in switchgear cabinets are often constructed in a draw-out configuration that allows breaker insertion or removal by moving the breaker in a cradle assembly. The draw-out breakers have a connected position in which clusters, i.e. connectors having opposing stacks of plate-like fingers, engage bus bar extensions of bus bars in the switchgear cabinet. In a disconnected position, including the test position in some types of breakers, the clusters are disconnected from the bus bar extensions. To cover access to, and prevent inadvertent contact with, the bus bar extensions when the breaker is in the disconnected position, shutter systems have been utilized across a back plane of the cradle assembly. One shutter system includes sliding panels that protect all breaker phases at the same time. Another shutter system, taught in the copending International Application No. PCT/US2013/031345, filed Mar. 14, 2013, entitled "Independent Shutter System for Rack-In Breakers", of common ownership herewith, includes a curtain having a pair of movable "hands" that are mounted to slide on a curtain mount, which, in turn, is mounted to slide on a pedestal that is mounted to a back-mold.

Circuit breakers are also used in motor control units, wherein the motor control unit may be inserted or removed from a motor control center (MCC) switchgear cabinet without shutting down all power to the cabinet. The motor control units have a connected position in which female connectors of the breakers are connected to respective bus bars, and a disconnected position in which the female connectors are disconnected from the bus bars. To cover access to, and prevent inadvertent contact with, the bus bars when the motor control unit is in the disconnected position, a common shutter system has been utilized across all power phases supplying the motor control unit.

Both draw-out circuit breakers and motor control units may share the requirement of making and breaking connections with installed bus bars or bus bar extensions i.e. the incoming power conductors contained in the switchgear cabinet. The making and breaking of connections and the handling of heavy currents in the area of connection between control devices like circuit interrupters (breakers), makes this area of the cabinet particularly susceptible to arcing. An arc flash is the rapid release of energy due to an arcing fault between phases, neutral or ground contacts. The resulting arc flash has the potential to cause considerable damage, including arcing-induced erosion of the contacts and injury to operators. The temperature of an arc flash may be capable of vaporizing metal and sending a blast of plasma and molten metal in all directions with extreme force. Damage may be caused to the switchgear both by the explosion of the arc flash and by the heat radiating from the blast. It is important to minimize the potential for harm to equipment and people by containing and redirecting the arc energy out from the switchgear.

SUMMARY OF THE INVENTION

Arc resistance pertains to the ability to withstand the destructive energy released during an arc flash, by interrupting and channeling the energy away from personnel and adjacent equipment. Passive arc resistance may include directed venting of the arc flash energy and gases out of the switchgear and reinforcement of the switchgear structure to withstand the blast. An example of passive arc resistance from the applicant features so-called arc-block technology which provides capability to passively attenuate and extinguish arc events, and which is described in the copending International Patent Application WO 2013/158723, published Oct. 24, 2013, entitled "Passive Arc Management System With Flue Chamber", of common ownership herewith, wherein an electrical distribution cabinet has an arc attenuating chamber surrounding the electrical connection point between a cluster, i.e. electrical power connector, of a draw out circuit breaker and a bus bar extension. The arc attenuating chamber is formed by sliding a cluster shield surrounding a cluster at the back of the breaker, into a slightly larger phase barrier that surrounds the bus bar extension, so that the leading edges of the cluster shield and phase barrier overlap and form the chamber. The arc attenuating chamber provides a flue channel that lengthens the arc and attenuates the current and temperature until the arc is extinguished. The mechanism is particularly suited for draw-out circuit breaker connections in a switch gear cabinet.

In an example embodiment of the present invention, an independently-moveable arc-resistant shutter assembly fits inside an arc attenuating chamber of an individual phase surround at the point of electrical connection between a circuit interrupting device, and a bus bar or bus bar extension. The point of connection will typically be referred to as the cluster of a draw out circuit breaker or the female connector of a motor control unit. The terms circuit interrupting device and circuit breaker may be used interchangeably herein and will be understood by the person having ordinary skill in the art to have the broader meaning.

The shutter assembly provides a physical barrier to debris, tools, and operator fingers, denying access to the bus bar or bus bar extension when the device, i.e. breaker, is disconnected from the bus bar or bus bar extension. The main body of the shutter has an opening through which the bus bar or bus bar extension passes.

The shutter assembly includes an insulator cap on a free end of the bus bar or bus bar extension. The shutter assembly includes an independently moveable shutter composed of an insulator material, which slides within the arc attenuating chamber. The shutter is slideable along the bus bar or bus bar extension away from the insulator cap, in response to a force applied by a leading edge of a connector assembly for the circuit interrupting device, when the device is being connected to the bus bar or bus bar extension.

In some embodiments, such as in a draw out circuit breaker, the connector assembly may include a cluster and its cluster shield. In other embodiments, such as in a motor control unit, the connector assembly may include a female connector and its connector protector and/or its fixed shroud. In still other embodiments, such as in either a draw out circuit breaker or a motor control unit, the connector assembly may be solely the connector, such as a cluster or a female connector. The independently moveable shutter is arranged to be contacted and moved by the connector assembly, when the circuit interrupter device is connected to the power supply from the bus bar or bus bar extension.

When the device is disconnected from the bus bar or bus bar extension the moveable shutter slides along the bus bar or bus bar extension toward the insulator cap, in response to a force applied by a spring biased support. In the disconnected position, the insulator cap fits closely within the opening in the shutter, thereby providing the physical barrier to debris, tools, and operator fingers, denying access to the bus bar or bus bar extension.

The shutter is a reinforced structure composed of an insulator material, which is a simple and strong design able to resist the destructive energy released during an arc flash. The insulator cap may be a coating of insulator material or it may be part of an insulator cover or sheath fit over the bus bar or bus bar extension and covering the free end thereof. The shutter assembly comprising the shutter and insulator cap, fits within the arc attenuating chamber of an individual phase, and is thus reliable while being easy to make and use.

BRIEF DESCRIPTION OF THE FIGURES

FIG. 5A is a front perspective view from the left side, of the motor control unit in a connected position to the vertical bus bars, via the phase barriers mounted in a rear bus frame in the motor control center cabinet (not shown).

FIG. 9A' is a top view of the motor control unit of FIG. 9A, showing the leading edge of the connector protector surrounding the female connector, applying a force on the shutter to slide the shutter along the bus bar away from the insulator cap, when in the connected position.

DETAILED DESCRIPTION OF EMBODIMENTS OF THE INVENTION

Figure 1A:
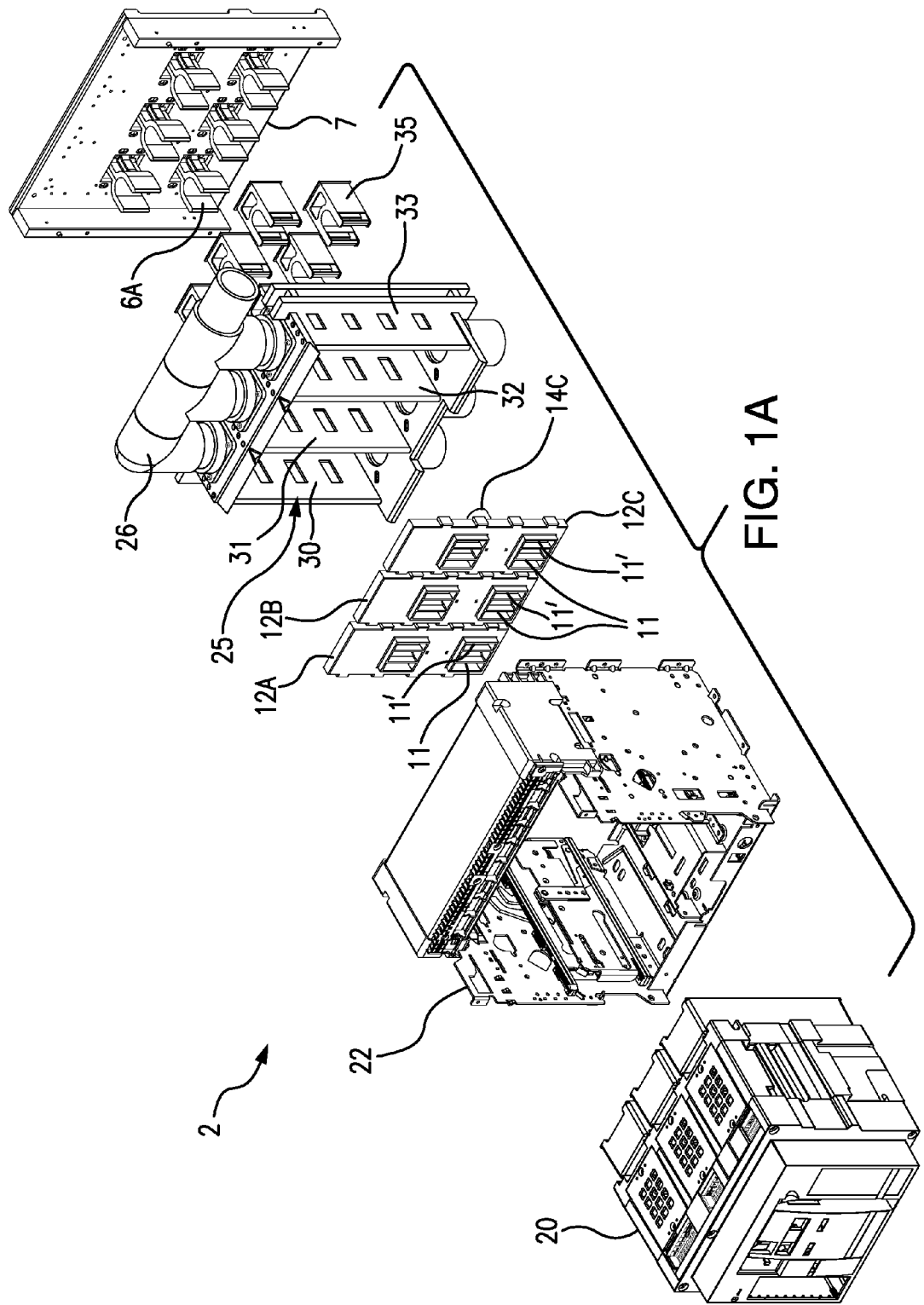
FIG. 1A is a front right side perspective, exploded view of switchgear cabinet a draw-out circuit breaker, a supporting cradle, an arrangement of independently movable arc resistant shutters, an arrangement of phase barriers, and a back-mold.

FIG. 1A is a front perspective, exploded view of from the right side of a draw out circuit breaker system 2, including a draw-out circuit breaker 20, a supporting cradle 22, a shutter assembly of independently movable, arc resistant shutters 12A, 12B, and 12C, an arrangement of phase barriers 30, 31, 32, and 33, an arrangement of sheaths 35 for bus bar extensions, an arrangement of bus bar extensions including the bus bar extension 6A, and a back-mold 7. The draw out circuit breaker system 2 may be typically installed in a switchgear cabinet (see, for example, FIG. 5) along with other electrical equipment and devices for distributing, controlling, and/or protecting electrical equipment. The supporting cradle 22 is for receiving the draw-out circuit breaker 20 that is movable in and out of contact with an electrical supply. Within the switchgear cabinet, the electrical supply may be received via one or more bus bars (not shown) having bus bar extensions, that extend towards the circuit breaker 20 from the back-mold 7 that separates the bus section from the device section of the cabinet, as further explained below.

The phase barriers surround, in part, each bus bar extension to contain arc flash and help quench and transfer an arc before it propagates inside the switchgear cabinet. The phase barriers 30, 31, 32, and 33 interleave with cluster shields of the circuit breaker, to contain the energy and channel it into an arc attenuating chamber that lengthens the arc and attenuates the current and temperature until the arc is extinguished.

To protect against inadvertent contact with the bus bar extensions when the circuit breaker 20 is in a test position or in a disconnected position (i.e., when the circuit breaker 20 is disconnected from the electrical supply), independently movable, arc resistant shutters 12A, 12B, and 12C operate within the interleaved phase barriers 30, 31, 32, and 33 and the cluster shields. The shutters 12A, 12B, and 12C, one for each phase, cover access to the bus bar extensions in the test position or disconnected position of the circuit breaker 20. When the circuit breaker 20 is in a connected position, and as discussed in more detail below, the shutters 12A, 12B, and 12C allow access to the bus bar extensions, independently of each other.

Figure 1B:
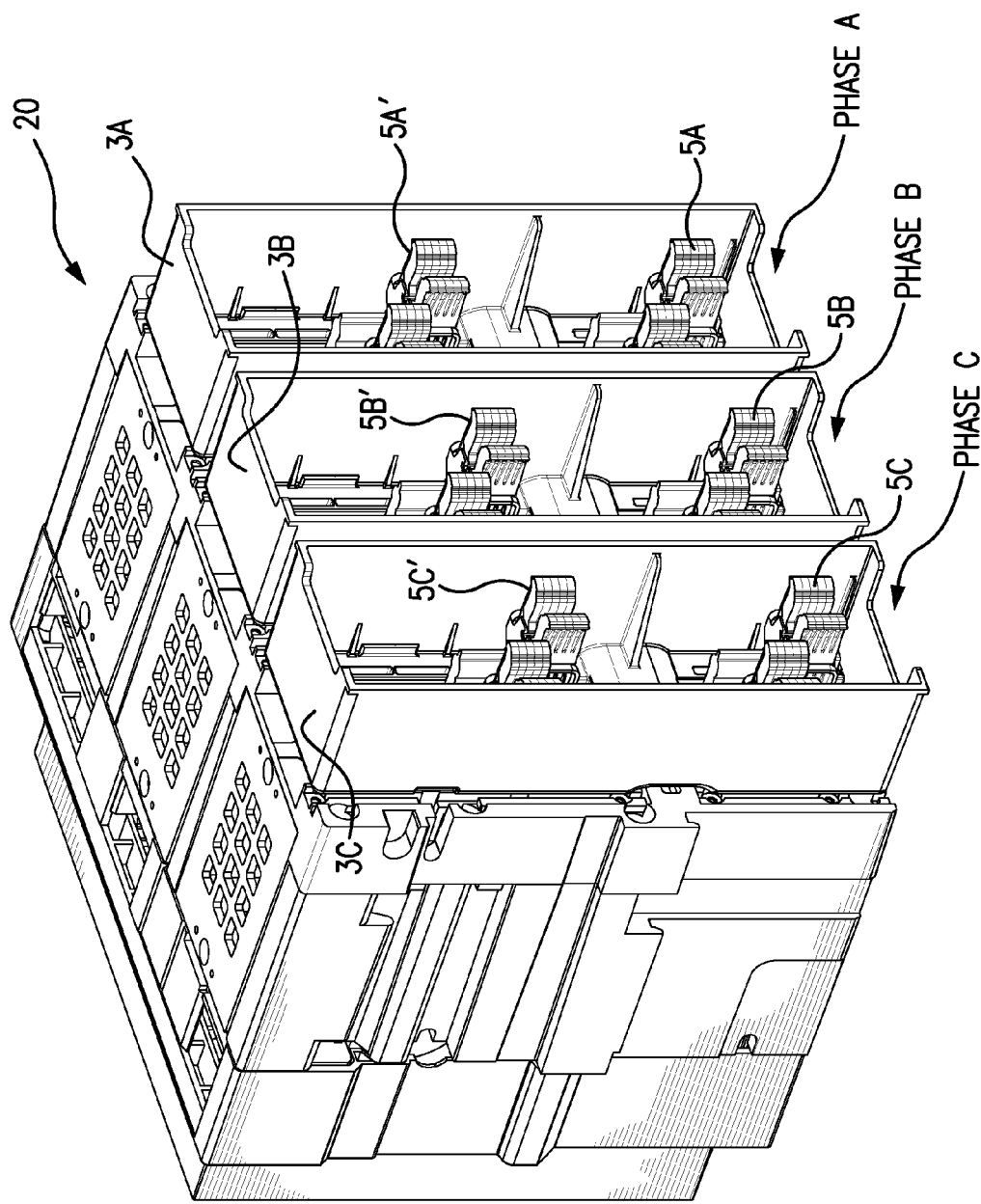
FIG. 1B is a back perspective view from the right side of the draw-out circuit breaker shown in FIG. 1A.

FIG. 1B is a back perspective view from the left side of the draw-out circuit breaker shown in FIG. 1A. The circuit breaker 20 includes clusters 5A, 5B, and 5C enclosed in part in respective cluster shields 3A, 3B, 3C. Each of the clusters is for a specific phase connection of the circuit breaker. The clusters are female connectors having opposing stacks of plate-like fingers that will surround and engage the bus bar extensions in the connected position. Each cluster and cluster shield comprises a respective connector assembly. In other embodiments, the connector assembly may be solely the connector, such as the cluster of cluster fingers. The clusters 5A, 5B, and 5C are the connecting apparatus fitted to the circuit breaker 20 for attaching it to respective phases of electrical power (here shown as three phases A, B, C) received via the bus bar extensions. The phases are separated in columns, with line and load connections of the circuit breaker 20 being arranged in rows. In other examples, the system 2 may have four, six, or eight poles. Also shown are clusters 5A', 5B', and 5C' that are the connecting apparatus for a three phase load. It will be appreciated that the load and line connection points can be variously arranged for an individual system according to the designer's dictates.

Each phase has a dedicated cluster shield 3A, 3B, and 3C that is mounted around its respective line and load clusters. The cluster shield 3A, 3B, and 3C is essentially a parallelepiped with four sides or faces forming an open box around the clusters. The cluster shields 3A, 3B, and 3C have open faces to permit the clusters to engage with their respective bus bar extensions when the circuit breaker 20 is in a connected position.

An arc attenuating chamber is formed by sliding a cluster shield 3A, for example, into a slightly larger space between two adjacent phase barriers 30 and 31 (FIG. 1A), so that the walls of the cluster shield 3A and phase barrier walls 30 and 31 overlap with space therebetween and form the chamber. The space between the overlapping walls provides a flue channel 25, indicated generally in FIG. 1A, that lengthens the arc and attenuates the current and temperature until the arc is extinguished. The flue channel 25 communicates with a chimney 26 to exhaust hot gases produced by the arc.

Figure 2:
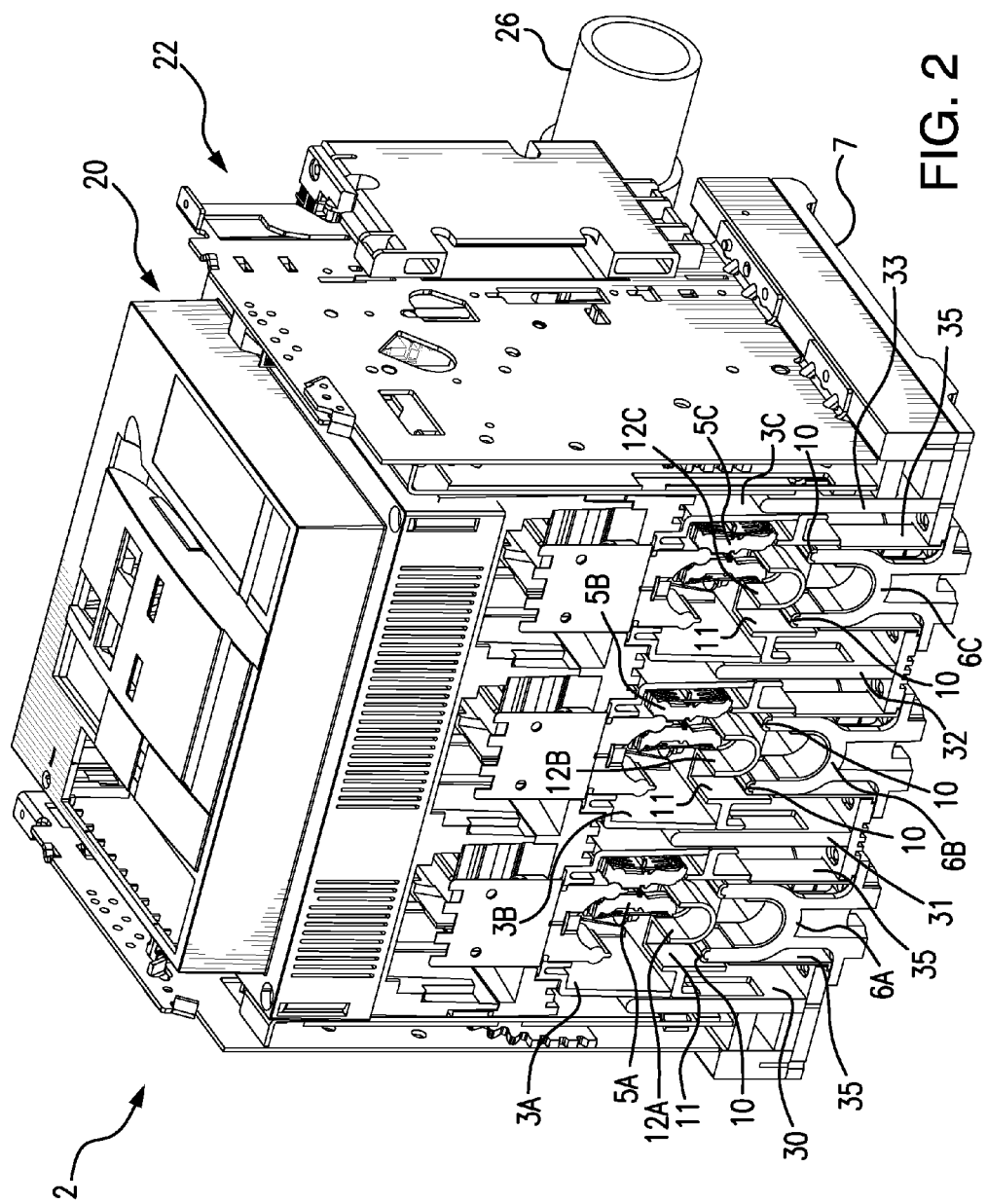
FIG. 2 is a bottom perspective, cut-away view from the right side of a supporting cradle for a draw-out circuit breaker, showing an example embodiment of independently movable, arc resistant shutters that cover access to bus bar extensions in the supporting cradle. The circuit breaker is shown with its cluster fingers disconnected from the bus bar extensions and the arc resistant shutters covering access to the bus bar extensions to prevent inadvertent contact with the bus bar extensions.

FIG. 2 is a bottom perspective, cut-away view from the right side of a supporting cradle 22 for a draw-out circuit breaker 20. The draw-out circuit breaker 20 and the supporting cradle 22 are so constructed that the circuit breaker 20 is supported and can be moved to either the main circuit connected or disconnected position without removing connections or mounting supports. The cradle 22 contains functional interconnections for the draw-out circuit breaker 20.

In an example embodiment, the circuit breaker 20 includes clusters 5A, 5B, and 5C separated from each other by respective cluster shields 3A, 3B, and 3C. Each cluster and cluster shield comprises a respective connector assembly. In a connected position, the clusters 5A, 5B, and 5C engage respective bus bar extensions 6A, 6B, and 6C of bus bars for electrical contact. The bus bar extensions 6A, 6B, and 6C are sometimes also known as turnable joint mounts (TJM). As will be understood by those in the art, the bus bar extensions 6A, 6B, and 6C are connected to power supply busses (not shown) located in the bus section of the switchgear cabinet on other side of the back-mold 7 from the circuit breaker 20.

The phase barriers 30, 31, 32, and 33 are mounted to the back-mold 7 at a fixed end and extend therefrom with a free end. The free ends of the phase barriers 30, 31, 32, and 33 overlap or interleave with the leading edges of the cluster shields 3A-3C of the circuit breaker connector assembly to form passive arc attenuating chambers. Pairs of the phase barriers 30, 31, 32, and 33 surround, in part, each bus bar extension 6A, 6B, and 6C, to contain arc flash and to provide a passive means to attenuate or extinguish an arc before it propagates.

FIG. 2 shows an example embodiment of independently movable, arc resistant shutters 12A, 12B, and 12C that cover access to three phases of power bus bar extensions 6A, 6B, and 6C extending through the back-mold 7. The circuit breaker 20 is shown with its line side (or load side) clusters 5A, 5B, and 5C disconnected from the respective power bus bar extensions 6A, 6B, and 6C. As further explained below, the arc resistant shutters 12A, 12B, and 12C, in conjunction with insulator caps 10, cover access to the bus bar extensions 6A, 6B, and 6C to prevent inadvertent contact with the bus bar extensions when the breaker 20 is withdrawn from the connected position. The arc resistant shutters 12A, 12B, and 12C fit within the phase barriers and may be composed of an electrically insulating material such as injection molded or cast plastic, for example polycarbonate, or epoxy, or it may also be a glass or ceramic material.

The example bus bar extensions 6A, 6B, and 6C are roughly "Y"-shaped, with each example bus bar extension having two tines in a forked or "U" shape, to increase their contact area. The example clusters 5A, 5B, and 5C are each arranged as opposed pairs of conductor fingers so as to grasp the respective tines of the intended bus bar extension. Other shapes of bus bar extensions 6A, 6B, and 6C and cluster fingers 5A, 5B, and 5C may be used. A set of load connectors (not shown in this view) provide connection between the load side of the circuit breaker 20 and a downstream load and are covered in the same fashion.

Figure 2A:
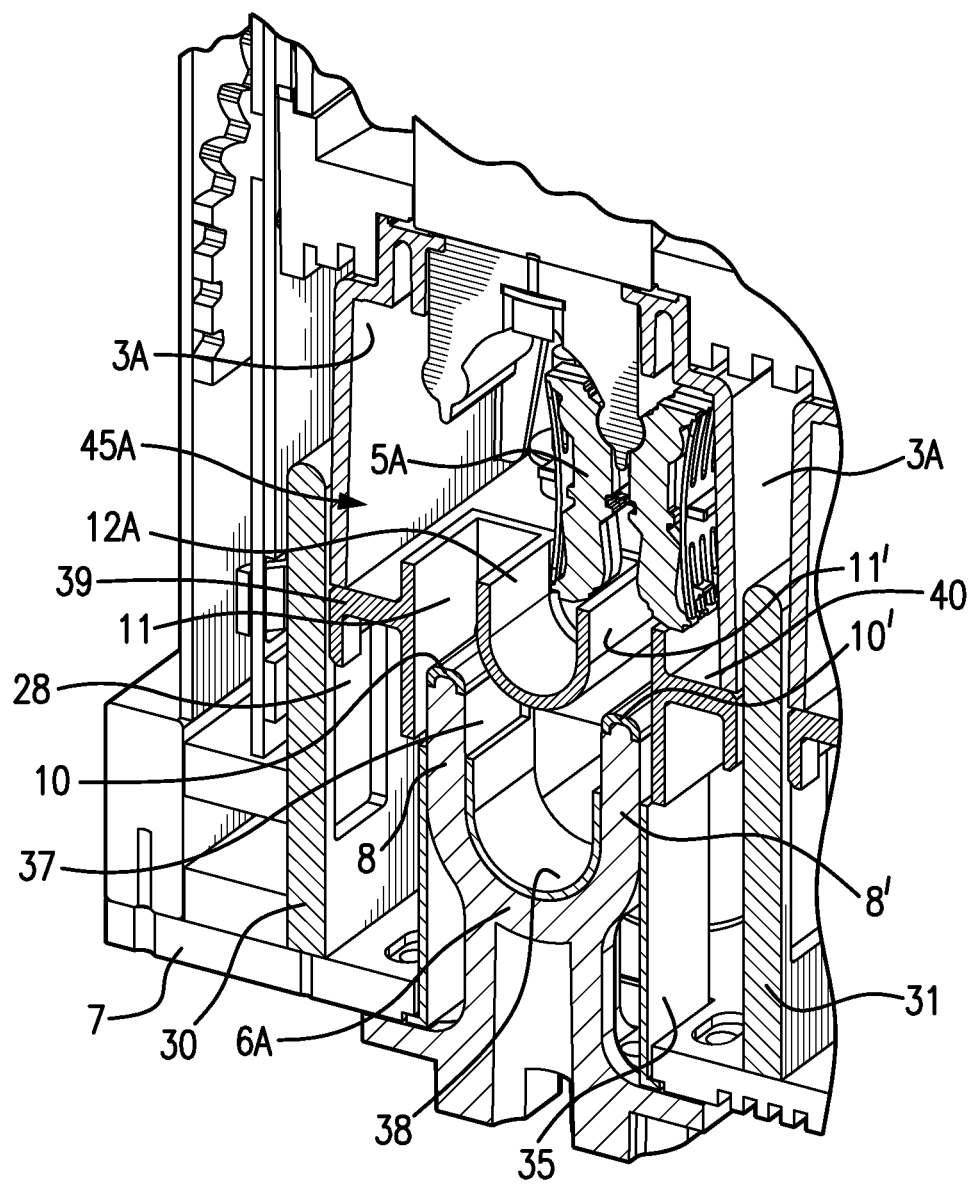
FIG. 2A is a detailed cut-away view of the arc resistant shutter invention of FIG. 2, showing one phase of the cluster fingers and the bus bar extensions in the disconnected position, illustrating an insulator cap that covers the free end of the bus bar extension. The figure shows an opening in the shutter, through which the bus bar extension passes in the connected position. To simplify the figure, only one cluster is shown.

FIG. 2A is a detailed cut-away view of the arc resistant shutter invention of FIG. 2, showing the phase A cluster 5A and the phase A bus bar extension 6A in the disconnected position. To simplify the figure, only one cluster is shown although it is apparent that two may be utilized. The figure illustrates an insulator cap 10 that covers the free end of the tine 8 of the bus bar extension 6A and an insulator cap 10' that covers the free end of the tine 8' of the bus bar extension 6A. The insulator caps 10 and 10' may be in the form of a coating adhesively applied to the free end of the bus bar extension. As illustrated, the insulator caps 10 and 10' are part of a unitary cover or sheath 35 for the bus bar extension 6A, with side walls of the sheath presenting an open area 37 to expose the conductive surface of the bus bar extension 6A. The sheath 35 is captured between the bus bar extension 6A and the back-mold 7. The insulator caps 10 and 10' and sheath 35 may be composed of an electrically insulating material such as injection molded or cast plastic, for example polycarbonate, or epoxy, it may also be a glass or ceramic material.

The figure shows openings 11 and 11' in the shutter 12A, through which the respective tines 8 and 8' of the bus bar extension 6A pass when the circuit breaker 20 is in the connected position. When the circuit breaker is moved into the disconnected position shown in FIG. 2A, the shutter 12A slides forward along, i.e. over, the bus bar extension 6A and approaches the insulator caps 10 and 10' bus bar extension. In this position, the insulator caps 10 and 10' fit closely within the respective openings 11 and 11' in the shutter 12A and provide a finger-safe shield for the opening. That is, the close fit of the shutter 12A with the insulator caps 10 and 10' prevents access to the bus bar extension 6A when the circuit breaker 20 is in the disconnected position. The phase barrier 30 is shown with a guide slot 28 indention that receives a boss 41 on the side of the shutter 12A (shown in detail in FIGS. 4A and 4B), to guide the shutter 12A as it slides along, i.e. over, the bus bar extension 6A.

When the breaker 20 is not present or has been withdrawn to a disconnect position, the shutter 12A will be driven by a spring element 14A (shown in FIG. 4B), to the outermost position of its travel to assume the finger-safe position. In this position, as shown in FIG. 2A, all of the energized, conductive surfaces have been covered rendering the space as "touch safe".

Figure 3:
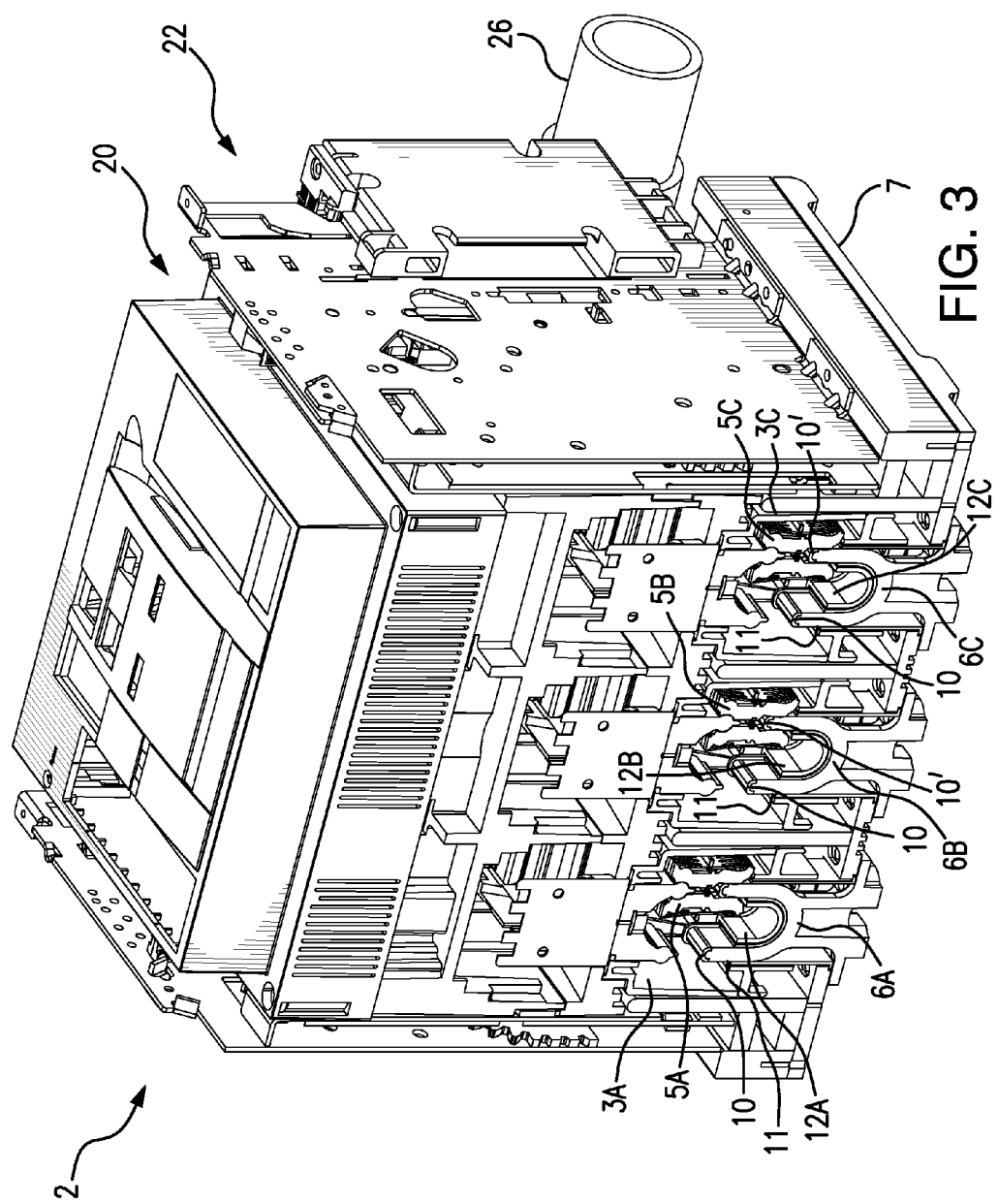
FIG. 3 is a bottom perspective, cut-away view from the right side of the supporting cradle for the draw-out circuit breaker of FIG. 1A, showing the cluster fingers of the circuit breaker connected to the bus bar extensions and the arc resistant shutters sliding backward along the bus bar extensions to allow access for electrical contact.
Figure 3A:
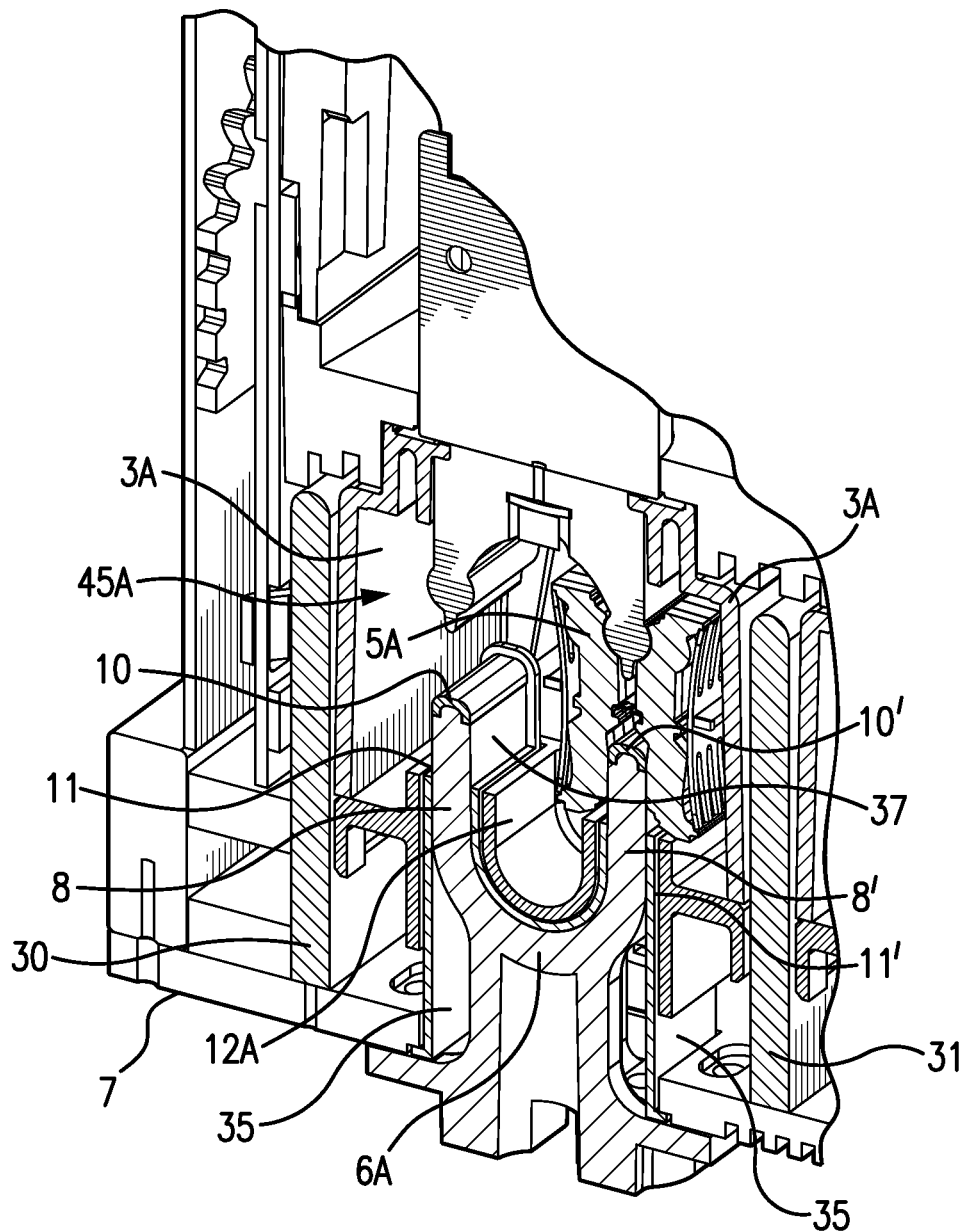
FIG. 3A is a detailed cut-away view of the arc resistant shutter invention of FIG. 3, showing one phase of the cluster fingers and the bus bar extensions in the connected position, illustrating the arc resistant shutters sliding backward along the bus bar extensions to allow access for electrical contact. To simplify the figure, only one cluster is shown.

Referring to FIGS. 3 and 3A, from a disconnected position, the breaker 20 has been racked into the cradle 22 by the user to the connected position. The movement of the breaker toward the back-mold 7 causes each cluster shield, e.g. 3A, to push on the respective shutter, e.g. 12A, and move it backwards. In the process of pushing on the shutters 12A-12C, the open areas 37 (FIG. 3A) of the bus bar extension shields 35 will become exposed and allow the respective breaker cluster fingers, e.g. 5A, to make electrical contact to the respective bus bar extensions, e.g. 6A, as the breaker reaches the connected position. Again referring to FIG. 2A, overlap sections 39 and 40 on the shutter 12A, abut the fixed phase barriers 30 and 31. The shutters thus help provide containment and interruption of arc energy on the bus bar extensions when the breaker and cluster shields are withdrawn to the disconnect position. The arc resistant performance is maintained even when the breaker is extracted from the disconnect position or removed from the cradle.

An arc attenuating chamber 45A is formed by the cluster shield 3A, overlapped with the two adjacent phase barriers 30 and 31 so that the leading edges of the cluster shield 3A and the free ends of the phase barriers 30 and 31 form the chamber. The phase barrier 30 is shown in FIG. 2A with the guide slot 28 indention that receives the boss 41 on the side of the shutter 12A (shown in detail in FIGS. 4A and 4B), to guide the shutter 12A as it slides in the arc attenuating chamber 45A. The arc attenuating chamber 45A includes the interleaved phase barriers 30, 31 and cluster shield 3A, the arc resistant shutter 12A, the sheath 35 with the insulator caps 10, 10' on the tips of the bus bar extension 6A, the overlap sections 39 and 40 on the shutter 12A, which abut the fixed phase barriers 30 and 31, and the cradle back-mold 7.

Figure 4B:
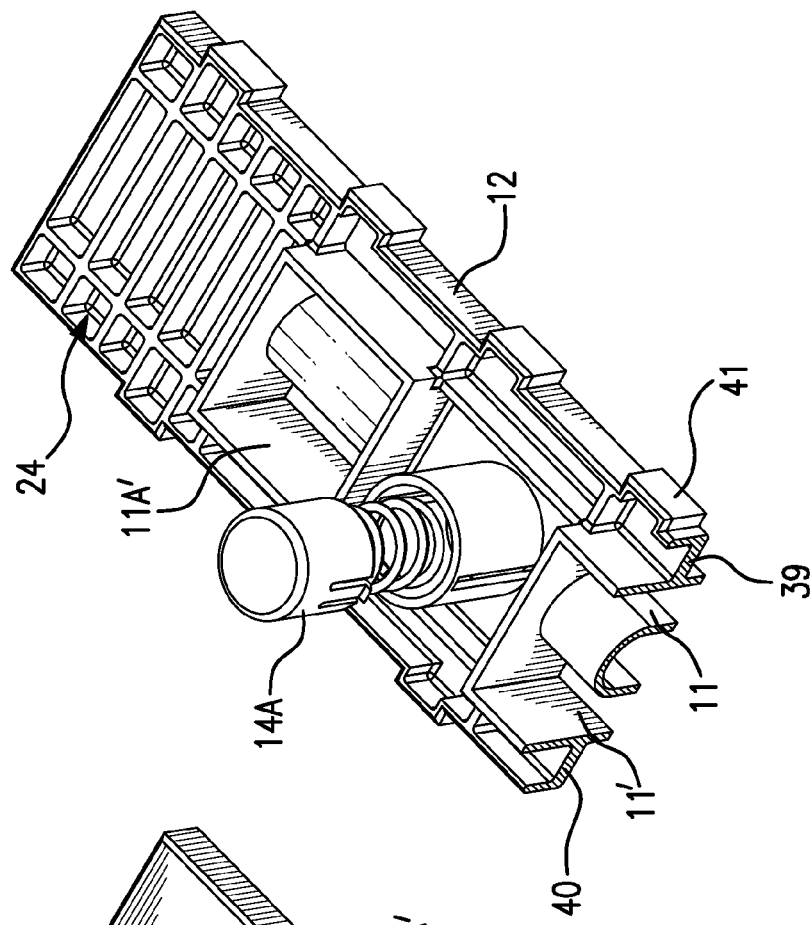
FIG. 4B is a back perspective, cut-away view from the right side of the arc resistant shutter of FIG. 4A. The figure shows details of the opening in the shutter, through which the bus bar extension passes, details of a reinforced structure of the shutter, to enhance arc resistance, and details of a spring biased support that moves the shutter forward along the bus bar extension when the circuit breaker is moved into the disconnected position.
Figure 4A:
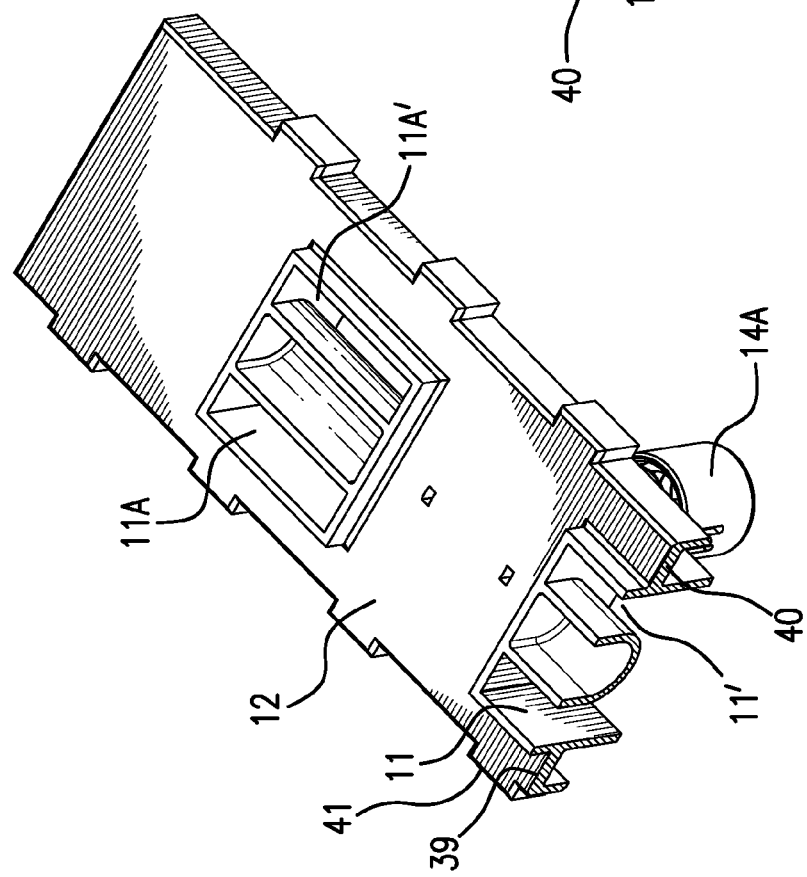
FIG. 4A is a front perspective, cut-away view from the right side of an example embodiment of the independently movable, arc resistant shutter. The figure shows details of the opening in the shutter, through which the bus bar extension passes.

FIG. 4A is a front perspective, cut-away view from the right side of an example embodiment of the independently movable, arc resistant shutter 12. In conjunction with FIG. 3A, the figure shows details of the cut-away openings 11 and 11' in the shutter 12, through which the respective tines 8 and 8' of the bus bar extension 6A can pass, to connect with the cluster fingers 5A of the circuit breaker 20. A second set of openings 11A and 11A' will allow the tines of a respective load bus bar extension to pass through the shutter 12. The overlap sections 39 and 40 are shown, which abut the fixed phase barriers 30 and 31. A boss 41 on the side of the shutter 12 rides in the guide slot 28 (FIG. 2A) of the phase barrier 30, as the shutter 12 moves forward and backward.

FIG. 4B is a back perspective view from the right side of the arc resistant shutter 12. The figure shows details of a reinforced structure 24 of ribs to strengthen the shutter, to enhance arc resistance. The figure shows details of a spring biased support 14A that may be mounted to or may press against or be braced against the back-mold 7, for example. The spring bias moves the shutter 12A forward along the bus bar extension 6A when the circuit breaker 20 is moved into the disconnected position. In this manner the spring 14A is a spring biased support for the moveable shutter 12A, mounted in a fixed position, on or against the back-mold 7, with respect to the bus bar extension 6A.

The arc resistant shutter 12A is designed to resist the pressure created during an arcing event, to insure that released gases are sufficiently cooled so as to pose no risk to the user, and that any arc formed between energized conductors will quickly self-extinguish. The mechanical strength of the arc resistant shutter 12A is enhanced by the material properties and the generous sections of the reinforcing ribs 24. The cooling and extinguishing properties are enhanced by the use of overlap sections 39 and 40 between the shutters and the phase barriers 30, 31, 32, and 33 and by the close fit of the insulator caps 10 and 10' within the openings 11 and 11' in the shutters.

Figure 5:
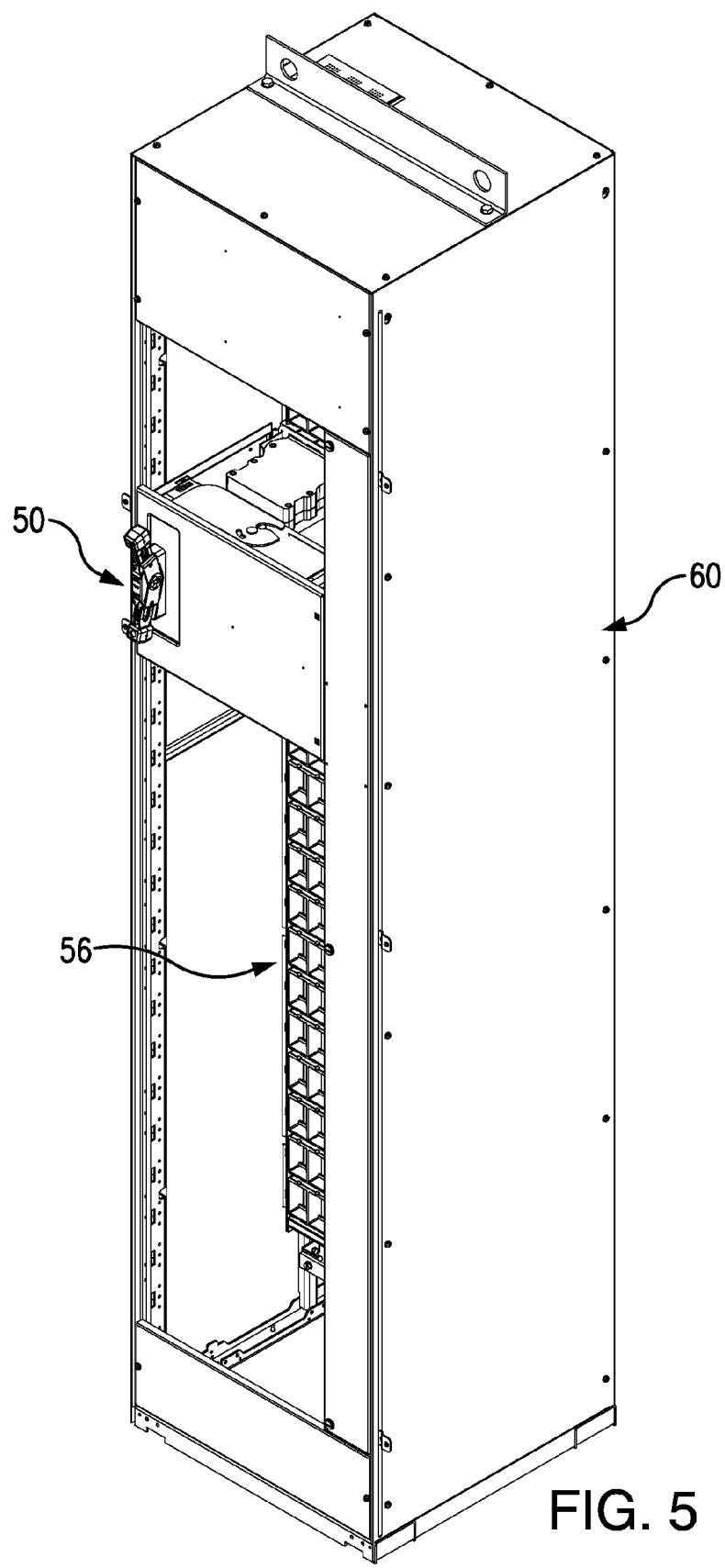
FIG. 5 a front perspective view from the right side, of a motor control center (MCC) cabinet into which has been inserted a motor control unit for connection to vertical bus bars via phase barriers shown lining the back of the cabinet.

FIG. 5 is a front perspective view from the right side, of a switchgear cabinet, being a motor control center (MCC) cabinet 60 into which has been inserted a motor control unit 50 for connection to vertical bus bars via phase barriers 56 shown at the back of the cabinet 60. One difference between a motor control unit and a draw-out circuit breaker, is that the motor control unit is not normally connected to the bus bars when the unit is initially racked into the MCC cabinet. The motor control unit has a handle-cam mechanism (not shown) to rack-in the unit into the MCC cabinet, which mechanically locks the motor control unit into place in the MCC cabinet. The operator must then actuate a separate connect/disconnect handle on the front of the motor control unit, to advance the movable female connectors, which can be clip-like conductive structures akin to clusters, of the motor control unit to electrically connect them to the bus bars.

Figure 9A:
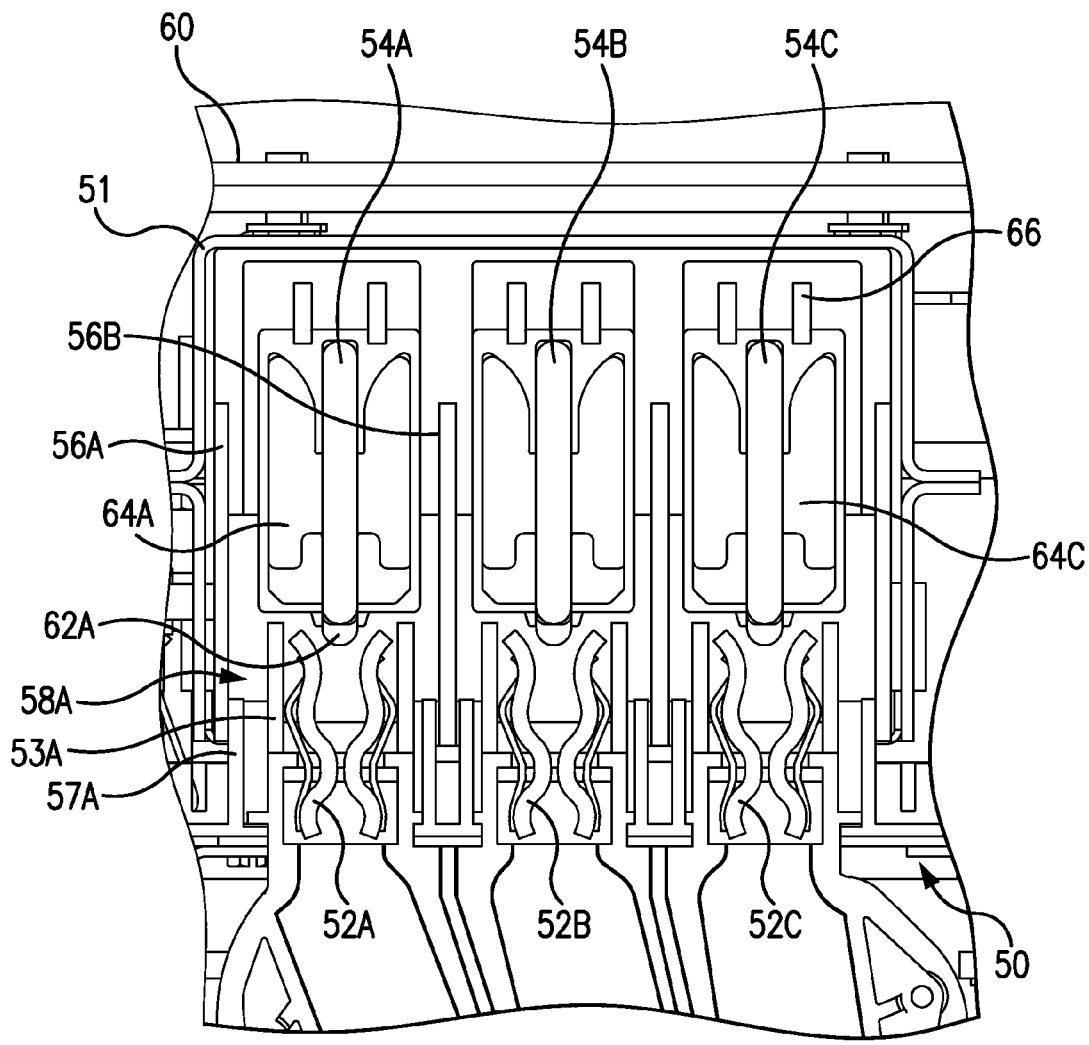
FIG. 9A is a top view of the motor control unit with the female connectors disconnected from bus bar. In the disconnected position, the insulator cap fits closely within the opening in the shutter, to deny access to the bus bar.
Figure 9A:
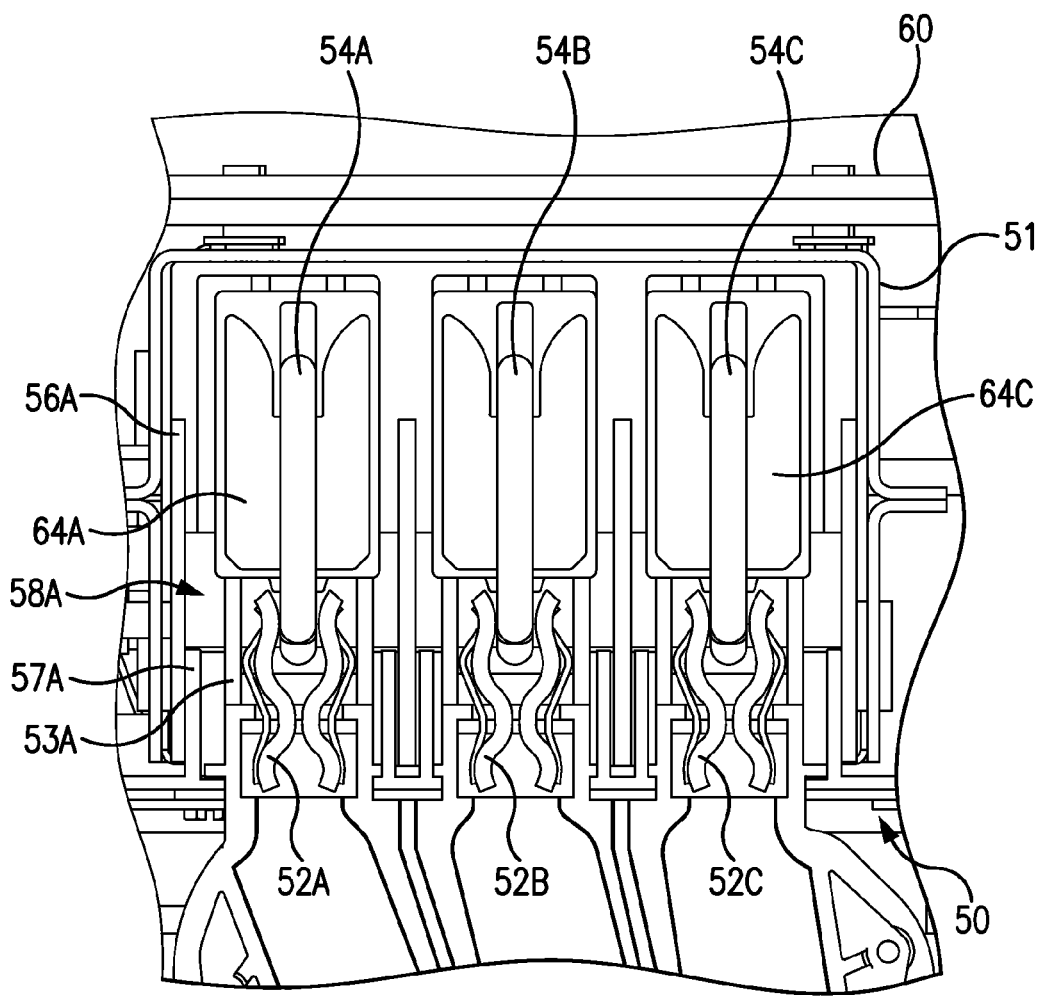

FIG. 5A is a front perspective view from the left side, of the motor control unit 50 in a connected position to the vertical bus bars 54A, 54B, and 54C, via the phase barriers 56 mounted in a rear bus frame 51 in the motor control center cabinet 60 (not shown). An exterior face of a back wall of the motor control unit is configured to be located adjacent to the vertical bus bars when the motor control unit has been inserted into the motor control center cabinet. Referring also to FIG. 9A', connector assemblies of a circuit breaker in the motor control unit 50, are connected to the vertical bus bars 54A, 54B, and 54C. A connector assembly is comprised of the female connector, for example 52A (collectively 52A, 52B, 52C), and one or both of a connector protector, e.g. 53A, surrounding the female connector 52A, and a fixed shroud 57A surrounding the connector protector 53A. In other embodiments, the connector assembly may be solely the connector, such as the female connector.

Figure 6:
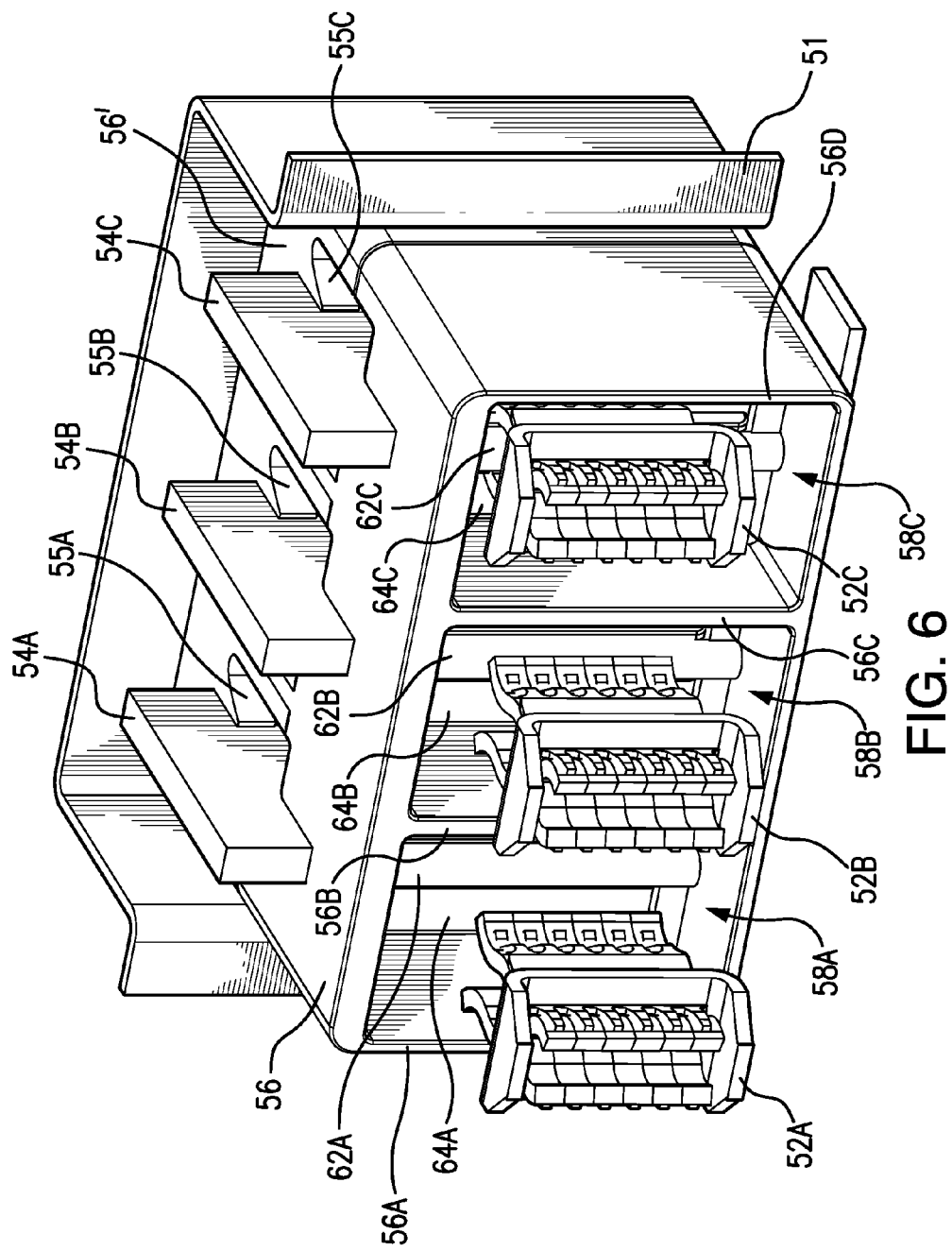
FIG. 6 is a front perspective view from the top, right side of the phase barriers mounted in the rear bus frame in the motor control center cabinet (not shown).

FIG. 6 is a front perspective view from the top, right side of the phase barriers 56 mounted in the rear bus frame 51 in the motor control center cabinet (not shown). In the figure, female connectors 52A, 52B, 52C are placed in progressive states of connection to the bus bars for explanatory purposes, but will be understood to move as a unit and be in the same state of connection during actual operation. The phase barriers 56A and 56B partially surround the vertical bus bar phase 54A. The phase barriers 56B and 56C partially surround the vertical bus bar phase 54B. The phase barriers 56C and 56D partially surround the vertical bus bar phase 54C. An insulator cap 62A, 62B, and 62C is shown covering the free, front end of each respective bus bar phase 54A, 54B, and 54C. An independently movable, arc resistant shutter, e.g. 64A, is located around each bus bar 54A-54C, and within the phase barriers, collectively 56, also surrounding each of the bus bars. The shutter assemblies comprising the independently movable, arc resistant shutters 64A, 64B, and 64C and respective insulator caps 62A, 62B, and 62C, prevent access to the respective bus bars 54A, 54B, and 54C when the motor control unit 50 is in the disconnected position and allow access to the respective bus bars 54A, 54B, and 54C when the motor control unit 50 is in the connected position of FIG. 5A.

When the motor control unit 50 is connected, an arc attenuating chamber 58A is formed for the A phase bus connection area by sliding the fixed shroud 57A surrounding female connector 52A (e.g. shown in FIG. 9A), into the slightly larger space between phase barriers 56A and 56B, so that the leading edges of the fixed shroud 57A and the free ends of the phase barriers 56A and 56B overlap and form the chamber 58A. An arc attenuating chamber 58B and 58C is likewise formed for each of the B and C phase busses 54B and 54C. The attenuating chambers 58A, 58B, and 58C will contain the energy of an arc flash produced between each female connector 52 and bus bar 54 and channel the energy into respective flues 55A, 55B, and 55C.

Figure 7:
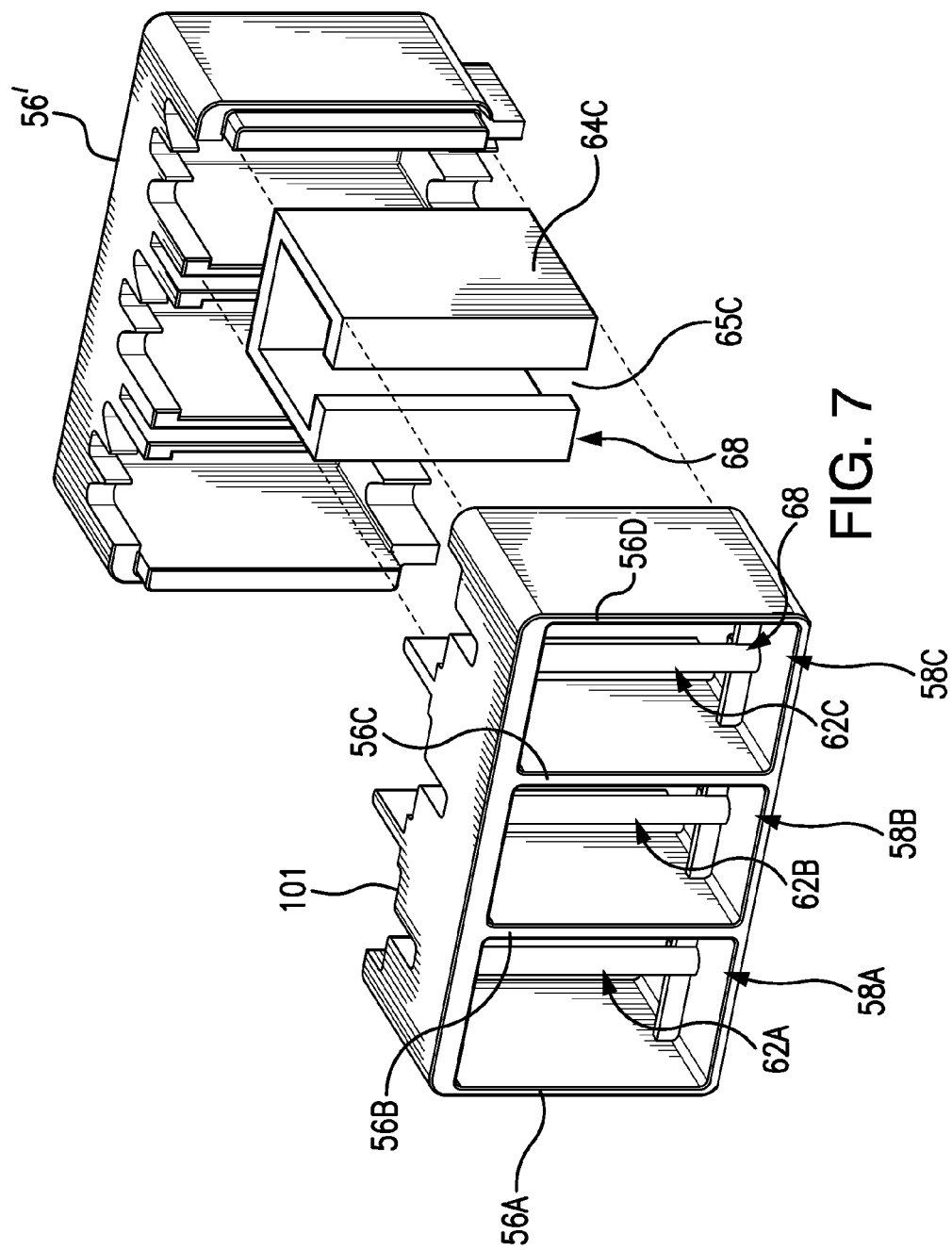
FIG. 7 is a front perspective, exploded view from the top, right side of a front section of the phase barriers, the arc resistant shutter, and a rear section of the phase barriers.

Referring to FIG. 7, the phase barrier assembly 56 includes a shutter assembly 68 that comprises an insulator cap 62C and an independently movable, arc resistant shutter 64C, for covering access to the bus bar 54C when the motor control unit 50 is in a disconnected position. The shutter 64C operates within the arc attenuating chamber 58C and allows the female connectors 52 to access the bus bars 54 when the motor control unit 50 is in the connected position.

After the motor control unit 50 has been racked into place in the MCC cabinet 60, the female connectors 52A, 52B, 52C of the motor control unit are as yet electrically disconnected from the bus bars 54A, 54B, 54C, as shown in FIG. 9A. Thereafter, the operator may actuate the connect/disconnect handle on the front of the motor control unit 50, to advance the female connectors to electrically connect them to the bus bars, as shown in FIG. 9A'. In one embodiment (FIG. 9C), the shutters 64A, 64B, 64C slide along the bus bars backwardly away from the insulator caps 62A, 62B, 62C, in response to the force applied by the leading edge of the female connectors, and the female connectors electrically connect to the respective bus bars.

FIG. 7 is a front perspective, exploded view from the top, right side of a front section 101 of the phase barrier assembly 56, the independently movable, arc resistant shutter 64C, and a rear section of the phase barriers 56'. The rear section of the phase barriers 56' fits on the back of the three bus bar phases 54A, 54B, and 54C (not shown) and the front section 101 of the phase barrier 56 fits on the front of the three bus bar phases. The front section 101 of the phase barrier 56 and rear section phase barrier 56' snap together to partially surround the bus bar phases 54A, 54B, and 54C, to provide a passive means to attenuate or extinguish arcs. In the exploded view, the independently movable, arc resistant shutter 64C is shown aligned to slide between the phase barriers 56C and 56D.

The insulator caps, collectively 62, are positioned within the front section of the phase barrier assembly 56 and fit on the front, free end, of their respective bus bars 54, when assembled.

A spring 66 (shown in FIG. 9A) is formed on the back of the arc resistant shutter 64C to provide a spring biased force that pushes against a fixed structure, such as the rear section of the phase barriers 56'. The shutter 64C is slideable along the bus bar 54C toward the insulator cap 62C, in response to the force applied by the spring 66, when the motor control unit is in the disconnected position. In this manner the spring 66 is a spring biased support for the shutter 64C, preferably mounted in a fixed position on or against the rear section of the phase barriers 56' with respect to the bus 54C.

Figure 8A:
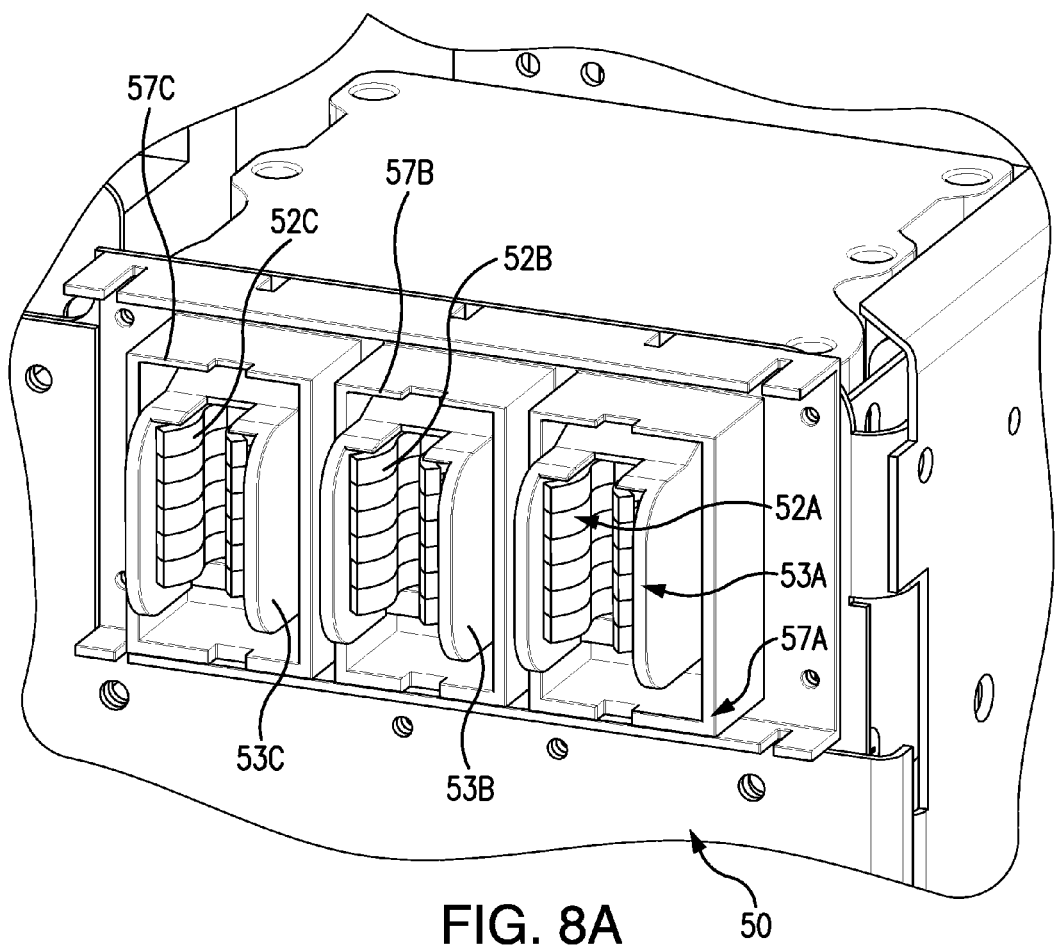
FIG. 8A is a top, back perspective view from the right, of the motor control unit, showing the connector protector surrounding the female connector, projecting out in a position to apply a force on the shutter to slide the shutter along the bus bar away from the insulator cap, when in the connected position.

The connector assembly of the breaker of the motor control unit 50 may be designed in a number of ways to make contact with the leading edge of the shutter. Three designs are shown. FIG. 8A is a top, back perspective view from the right, of the motor control unit 50 of FIG. 9A, showing the connector protectors 53A, 53B, and 53C surrounding the respective female connectors 52A, 52B and 52C, with a leading edge of the connector protector projecting out in a position to apply a force on the respective shutter 64A, 64B, and 64C to slide the shutter along the respective bus bar 54A, 54B, 54C backwardly away from the respective insulator cap 62A, 62B, and 62C, when in the connected position.

Figure 8B:
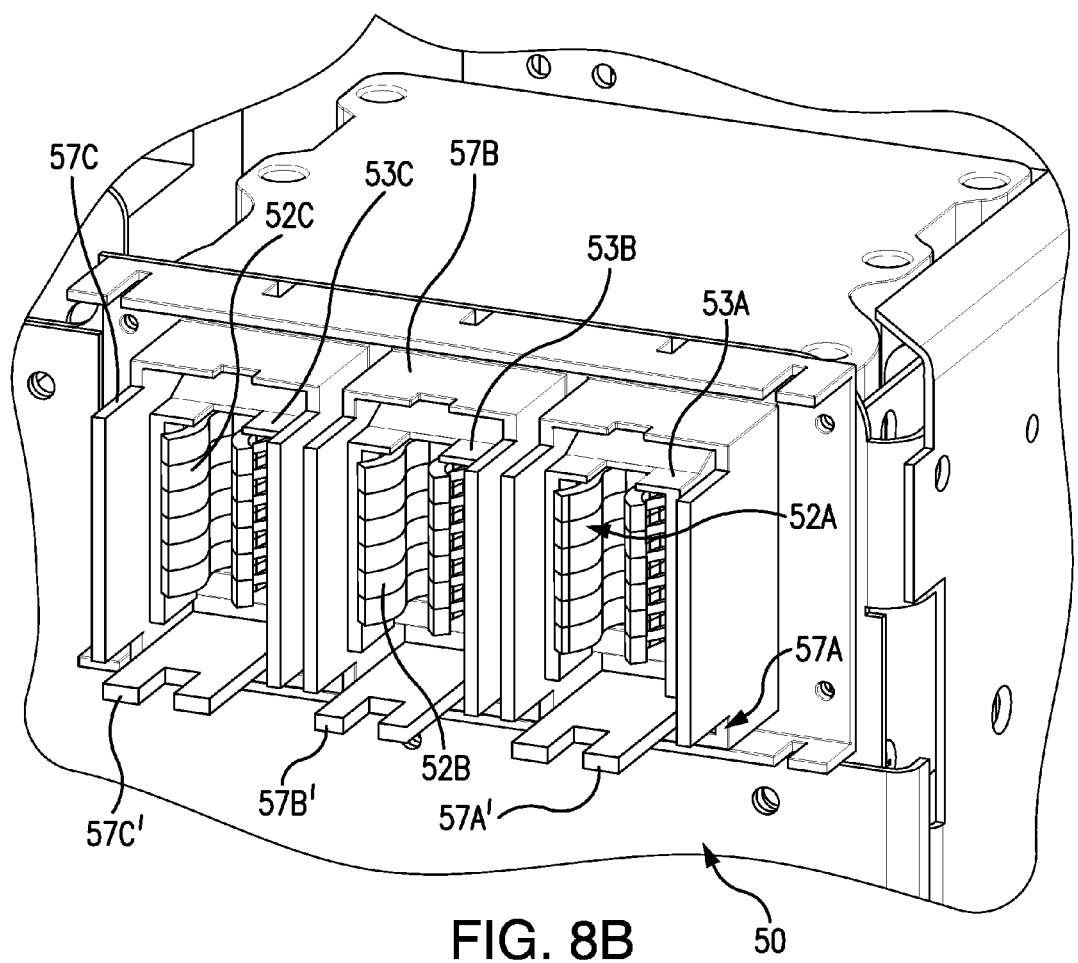
FIG. 8B is a top, back perspective view from the right, of the motor control unit, showing the fixed shroud surrounding the connector protector, the fixed shroud projecting out in a position to apply a force on the shutter to slide the shutter along the bus bar away from the insulator cap, when in the connected position.
Figure 9B:
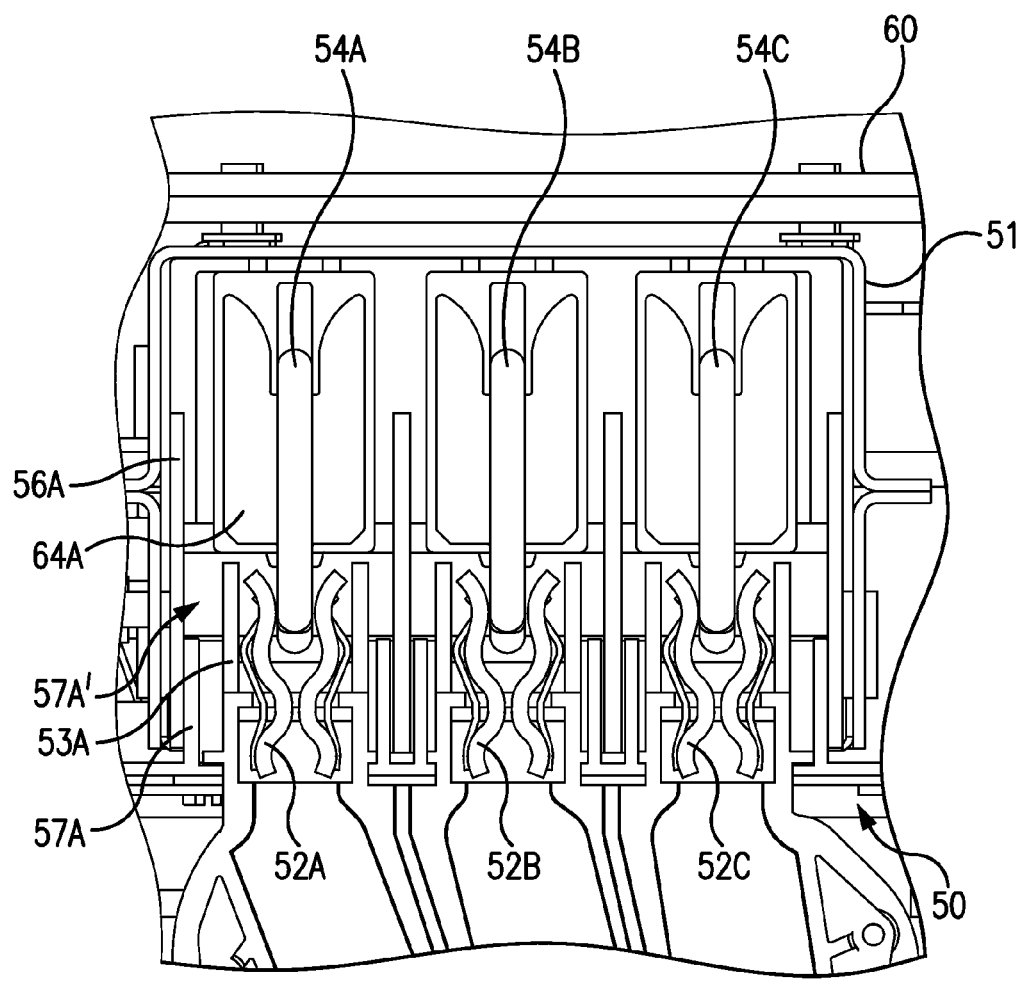
FIG. 9B is a top view of the motor control unit, showing the leading edge of the fixed shroud surrounding the connector protector and the female connector, applying a force on the shutter to slide the shutter along the bus bar away from the insulator cap, when in the connected position. In an example embodiment, the fixed shroud has an extension beneath the female connector, to apply the force on the shutter.

FIG. 8B is a top, back perspective view from the right, of the motor control unit 50 of FIG. 9B, showing the fixed shrouds 57A, 57B, and 57C surrounding the respective connector protector 53A, 53B, and 53C, with a bottom portion 57A', 57B', and 57C', for example, below the respective female connector 52A, 52B, and 52C, having a leading edge of the bottom portion 57A', 57B', and 57C' projecting out in a position to apply a force on the respective shutter 64A, 64B, and 64C to slide the shutter along the bus bar 54A, 54B, and 54C away from the insulator cap 62A, 62B, and 62C, when in the connected position.

Figure 8C:
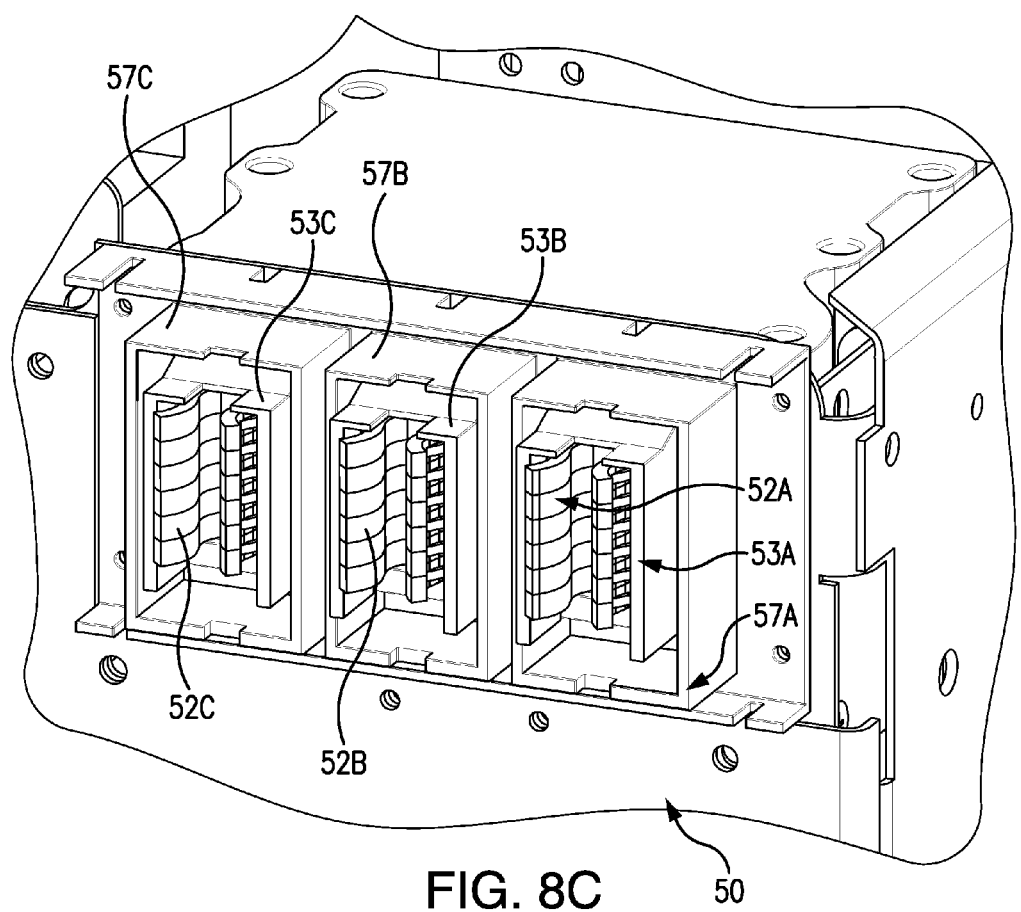
FIG. 8C is a top, back perspective view from the right, of the motor control unit, showing the female connector projecting out in a position to apply a force on the shutter to slide the shutter along the bus bar away from the insulator cap, when in the connected position.
Figure 9C:
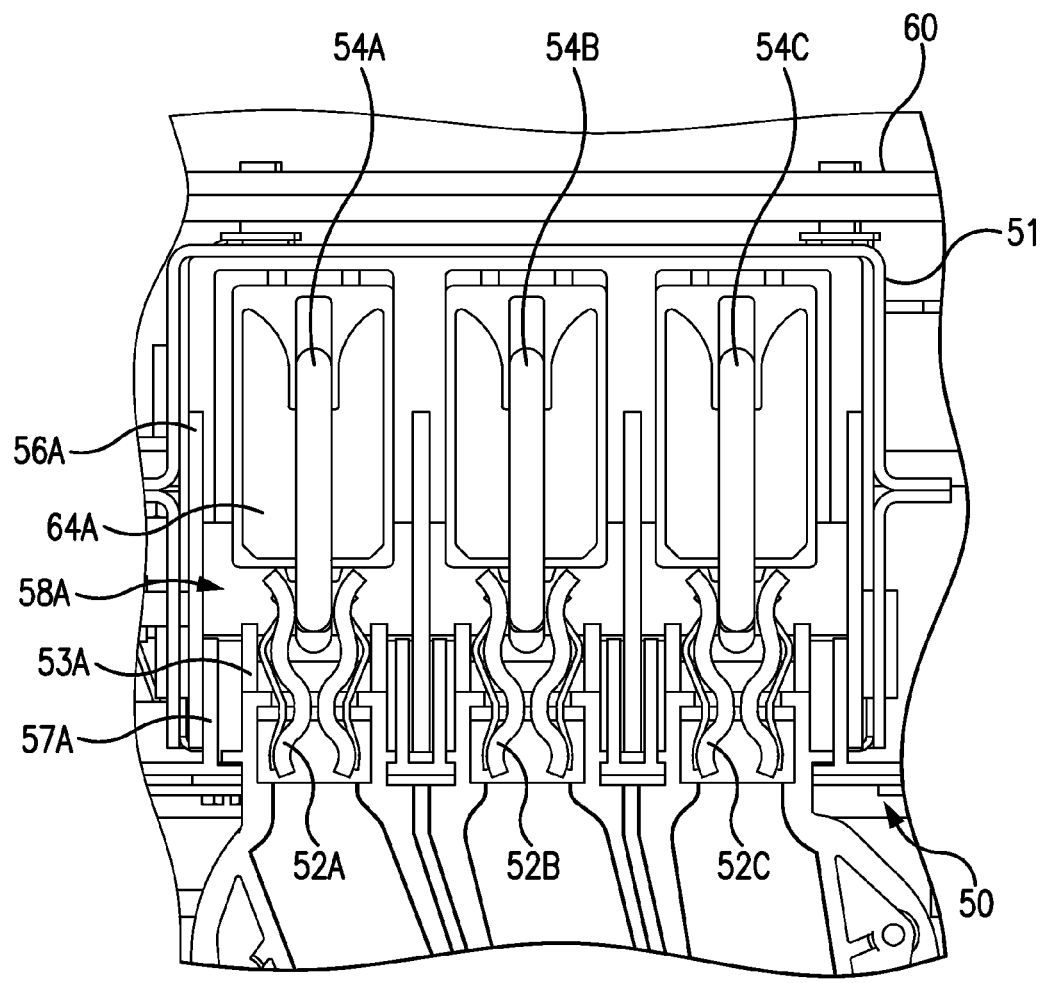
FIG. 9C is a top view of the motor control unit, showing the leading edge of the female connector applying a force on the shutter to slide the shutter along the bus bar away from the insulator cap, when in the connected position.

FIG. 8C is a top, back perspective view from the right, of the motor control unit 50 of FIG. 9C, showing the female connectors 52A, 52B, and 52C with their leading edges projecting out in a position to apply a force on the respective shutter to slide the shutter along the bus bar away from the insulator cap, when in the connected position.

FIG. 9A is a top view of the motor control unit 50 of FIG. 8A, showing the respective female connectors 52A, 52B, 52C disconnected from the respective bus bars 54A, 54B, 54C and the respective insulator caps 62A, 62B, 62C fitting closely in front of the bus bars within the openings in the shutters 64A, 64B, 64C, thereby providing an arc resistant shield for the openings to prevent access to the bus bars when in the disconnected position.

Pairs of phase barriers 56A, 56B, 56C, 56D surround in part each bus bar 54A, 54B, and 54C. The arc attenuating chamber 58A contains arc flash and helps quench and transfer an arc before it propagates. The arc attenuating chamber 58A is formed by sliding fixed shroud 57A, for example, into the slightly larger space between phase barriers 56A and 56B, so that the leading edges of the fixed shroud 57A and phase barriers 56A and 56B overlap and form the chamber 58A.

FIG. 9A' is a top view of the motor control unit of FIG. 9A, showing the female connectors 52A, 52B, 52C connected to the respective bus bars 54A, 54B, 54C. The leading edge of the respective connector protectors 53A, 53B, and 53C surrounding the female connector, applies a force on the shutter to slide the shutter along the bus bar backwardly away from the insulator cap, when in the connected position. The female connectors are shown fully connected with the bus bars. The free ends of the respective phase barriers 56A and 56B, for example, overlap the leading edge of a respective fixed shroud 57A surrounding the connector protector 53A, when in the connected position, to provide a passive means to channel arcs preferably to attenuate or extinguish the arcs.

FIG. 9B is a top view of the motor control unit 50 of FIG. 8B, showing an example embodiment, wherein the leading edge of the respective fixed shroud 57A, 57B, 57C surrounding the respective connector protector, applies a force on the respective shutter to slide the shutter along the respective bus bar away from the respective insulator cap, when in the connected position. In the example embodiment shown, a bottom portion 57A', for example, below the female connector 52A, projects out in a position to apply the force on the shutter.

FIG. 9C is a top view of the motor control unit 50 of FIG. 8C, showing an example embodiment, wherein the leading edge of the respective female connectors 52A, 52B, 52C applies a force on the respective shutter to slide the shutter along the respective bus bar away from the respective insulator cap, when in the connected position.

Although specific example embodiments of the invention have been disclosed, persons of skill in the art will appreciate that changes may be made to the details described for the specific example embodiments, without departing from the spirit and the scope of the invention.

The invention claimed is:

1. A shutter assembly for a switchgear cabinet, comprising:
 a shutter moveable along a bus bar or bus bar extension of a power bus, the shutter for covering access to the bus bar or bus bar extension, in a disconnected position for a circuit breaker,
 the bus bar or bus bar extension having an insulator cap covering a free end thereof,
 the shutter allowing access to the bus bar or bus bar extension in a connected position for the circuit breaker, the connected position being when a connector assembly of the circuit breaker is connected to the bus bar or bus bar extension,
 the movable shutter including
 a spring biased support,
 the moveable shutter having an opening through which the bus bar or bus bar extension passes, the shutter being slideable along the bus bar or bus bar extension away from the insulator cap, in response to a force applied by a leading edge of the connector assembly when in the connected position, and
 the shutter being slideable along the bus bar or bus bar extension toward the insulator cap, in response to a force applied by the spring biased support, when the circuit breaker is moved into the disconnected position, the insulator cap fitting closely within the opening in the shutter, to thereby prevent access to the bus bar or bus bar extension when the circuit breaker is in the disconnected position.

2. The shutter assembly for a switchgear cabinet, of claim 1, further including the circuit breaker and the connector assembly for the circuit breaker, the connector assembly including a connector for attachment to the bus bar or bus bar extension.

3. The shutter assembly for a switchgear cabinet, of claim 2, wherein the shutter assembly includes an independently movable shutter arranged to be contacted by the connector of the connector assembly.

4. The shutter assembly for a switchgear cabinet, of claim 1, further comprising the connector assembly, the connector assembly including a cluster enclosed in part within a cluster shield, and the bus bar or bus bar extension being surrounded in part by a phase barrier, wherein a free end of the phase barrier overlaps a leading edge of the cluster shield when the circuit breaker is in the connected position, to provide a passive means to attenuate or extinguish arcs.

5. The shutter assembly for a switchgear cabinet, of claim 1, further comprising the connector assembly including a female connector enclosed in part within a fixed shroud, and the bus bar or bus bar extension being surrounded in part by a phase barrier, wherein a free end of the phase barrier overlaps a leading edge of the fixed shroud when the circuit breaker is in the connected position, to provide a passive means to attenuate or extinguish arcs.

6. The shutter assembly for a switchgear cabinet, of claim 1, wherein the shutter is composed of an insulator material.

7. A switchgear cabinet, comprising:
 a circuit breaker with clusters of cluster fingers, each of the clusters having a plurality of cluster fingers enclosed in part within a cluster shield;
 bus bar extensions attached to a back-mold, respective bus bar extensions being engaged with respective clusters when the circuit breaker is in a connected position, the bus bar extensions being disengaged from the clusters when the circuit breaker is in a disconnected position, each bus bar extension having an insulator cap covering a free end of the bus bar extension; and
 an independently movable shutter moveable along a bus bar extension, the shutter for covering access to the bus bar extension in the disconnected position and allowing access to the bus bar extension in the connected position, the movable shutter including
 a spring biased support mounted in a fixed position with respect to the bus bar extension,
 the moveable shutter being mounted to the support, the shutter having an opening through which the bus bar extension passes, the shutter being slideable along the bus bar extension away from the insulator cap, in response to a force applied by a leading edge of the cluster shield when in the connected position, and
 the shutter being slideable along the bus bar extension toward the insulator cap, in response to a force applied by the spring biased support, when in the disconnected position, the insulator cap fitting closely within the opening in the shutter, to thereby prevent access to the bus bar extension when in the disconnected position.

8. The switchgear cabinet of claim 7, wherein each of the clusters includes cluster fingers for a specific phase connection of the circuit breaker, the clusters including a first cluster for a first phase and a second cluster for a second phase.

9. The switchgear cabinet of claim 8, wherein a first independently moveable shutter is arranged to be contacted by cluster fingers of the first cluster and a second independently moveable shutter is arranged to be contacted by cluster fingers of the second cluster.

10. The switchgear cabinet of claim 7, further comprising a phase barrier mounted to the back-mold at a fixed end and extending therefrom with a free end;
 the free end of the phase barrier overlapping the leading edge of the cluster shield when in the connected position, to provide a passive means to attenuate or extinguish arcs.

11. The switchgear cabinet of claim 7, wherein the shutter is composed of an insulator material.

12. A switchgear cabinet, comprising:
 a motor control unit configured to be inserted into a motor control center, the motor control unit including a circuit breaker, the motor control unit further having an exterior face of a back wall of the motor control unit being configured to be located adjacent to bus bars of a power bus when the motor control unit has been inserted into the motor control center;

connector assemblies moveably mounted in the motor control unit, each of the connector assemblies being electrically connected to a respective phase of the circuit breaker, each of the connector assemblies being configured to project from the back wall of the motor control unit, to mechanically and electrically engage a respective bus bar for electrical connection therewith in a connected position, when the connector assembly is moved toward the power bus;

the respective bus bar being disengaged from the connector assembly in a disconnected position, when the connector assembly is moved away from the power bus, each bus bar having an insulator cap covering a free end of the bus bar; and an independently movable shutter moveable along a bus bar, the shutter for covering access to the bus bar in the disconnected position and allowing access to the bus bar in the connected position, the movable shutter including
a spring biased support mounted in a fixed position with respect to the bus bar,
the moveable shutter mounted to the support, the shutter having an opening through which the bus bar passes, the shutter being slideable along the bus bar away from the insulator cap, in response to a force applied by a leading edge of the connector assembly when in the connected position, and
the shutter being slideable along the bus bar toward the insulator cap, in response to a force applied by the spring biased support, when in the disconnected position, the insulator cap fitting closely within the opening in the shutter, to thereby prevent access to the bus bar when in the disconnected position.

13. The switchgear cabinet of claim 12, wherein the connector assembly comprises a female connector and one or both of a connector protector surrounding the female connector, and a fixed shroud surrounding the connector protector.

14. The switchgear cabinet of claim 13, wherein a leading edge of the female connector applies the force on the shutter to slide the shutter along the bus bar away from the insulator cap, when in the connected position.

15. The switchgear cabinet of claim 13, wherein a leading edge of the connector protector surrounding the female connector, applies the force on the shutter to slide the shutter along the bus bar away from the insulator cap, when in the connected position.

16. The switchgear cabinet of claim 13, wherein a leading edge of the fixed shroud surrounding the connector protector, applies the force on the shutter to slide the shutter along the bus bar away from the insulator cap, when in the connected position.

17. The switchgear cabinet of claim 13, further comprising a phase barrier mounted in the motor control center, the phase barrier surrounding in part a respective bus bar, the phase barrier being mounted at a fixed end and extending therefrom with a free end;

the free end of the phase barrier overlapping a leading edge of the fixed shroud surrounding the connector protector when in the connected position, to provide a passive means to attenuate or extinguish arcs.

18. The switchgear cabinet of claim 12, wherein the connector assemblies include a first connector assembly for a first bus bar and a second connector assembly for a second bus bar.

19. The switchgear cabinet of claim 18, wherein a first independently moveable shutter is arranged to be contacted by the first connector assembly and a second independently moveable shutter is arranged to be contacted by the second connector assembly.

20. The switchgear cabinet of claim 12, wherein the shutter is composed of an insulator material.

* * * * *